United States Patent
Qiang et al.

(10) Patent No.: US 10,223,272 B2
(45) Date of Patent: Mar. 5, 2019

(54) LATENCY SENSITIVE METADATA OBJECT PERSISTENCE OPERATION FOR STORAGE DEVICE

(71) Applicant: Seagate Technology, LLC, Cupertino, CA (US)

(72) Inventors: Jian Qiang, Singapore (SG); Harry Tiotantra, Singapore (SG); Kai Chen, Singapore (SG); WenXiang Xie, Singapore (SG); Andrew Michael Kowles, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/496,761

(22) Filed: Apr. 25, 2017

(65) Prior Publication Data
US 2018/0307609 A1    Oct. 25, 2018

(51) Int. Cl.
*G06F 12/0868* (2016.01)
*G06F 17/30* (2006.01)
*G06F 16/901* (2019.01)

(52) U.S. Cl.
CPC ...... *G06F 12/0868* (2013.01); *G06F 16/9027* (2019.01); *G06F 17/30961* (2013.01); *G06F 2212/1024* (2013.01); *G06F 2212/281* (2013.01)

(58) Field of Classification Search
CPC ........... G06F 12/0868; G06F 17/30961; G06F 2212/1024; G06F 2212/281
See application file for complete search history.

(56) References Cited

U.S. PATENT DOCUMENTS

| | | |
|---|---|---|
| 5,649,139 A | 7/1997 | Weinreb et al. |
| 6,507,853 B2 | 1/2003 | Bamford et al. |
| 6,516,426 B1 | 2/2003 | Forehand et al. |
| 7,636,807 B2 | 12/2009 | Shin et al. |
| 7,707,184 B1 | 4/2010 | Zhang et al. |
| 7,711,923 B2 | 5/2010 | Rogers et al. |
| 7,966,456 B2 | 6/2011 | Trika et al. |
| 8,255,617 B2 | 8/2012 | Goss et al. |
| 8,452,929 B2 | 5/2013 | Bennett |
| 8,560,770 B2 | 10/2013 | Haines et al. |
| 8,655,850 B2 | 2/2014 | Ngo et al. |
| 9,201,783 B2 | 12/2015 | Song |
| 9,208,210 B2 | 12/2015 | Erofeev |
| 9,280,477 B2 | 3/2016 | Friendshuh et al. |
| 9,411,717 B2 | 8/2016 | Goss et al. |

(Continued)

*Primary Examiner* — Eric Cardwell
(74) *Attorney, Agent, or Firm* — Hall Estill Attorneys at Law

(57) ABSTRACT

Apparatus and method for managing metadata in a data storage device. In some embodiments, a metadata object has entries that describe data sets stored in a non-volatile write cache. During an archival (persistence) operation, the metadata object is divided into portions, and the portions are copied in turn to a non-volatile memory at a rate that maintains a measured latency within a predetermined threshold. A journal is formed of time-ordered entries that describe changes to the metadata object after the copying of the associated portions to the non-volatile memory. The journal is subsequently stored to the non-volatile memory, and may be subsequently combined with the previously stored portions to recreate the metadata object in a local memory. The measured performance latency may be related to a specified customer command completion time (CCT) for host commands.

20 Claims, 5 Drawing Sheets

(56) References Cited

U.S. PATENT DOCUMENTS

| | | |
|---|---|---|
| 2008/0005509 A1 | 1/2008 | Smith et al. |
| 2011/0161557 A1 | 6/2011 | Haines et al. |
| 2011/0191522 A1 | 8/2011 | Condict et al. |
| 2016/0098352 A1 | 4/2016 | Tan et al. |

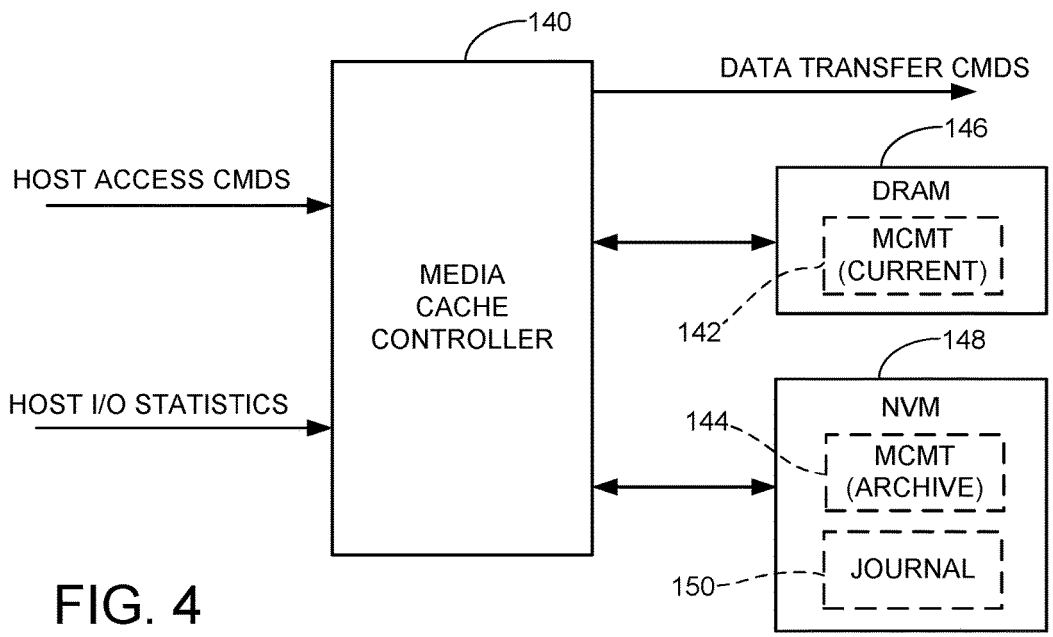
FIG. 4
METADATA OBJECT FORMAT
| 1 | LBA A | PBA W | VERSION 1 | PORTION ID |
| 2 | LBA B | PBA X | VERSION 3 | PORTION ID |
| 3 | LBA C | PBA Y | VERSION 4 | PORTION ID |
| 4 | LBA D | PBA Z | VERSION 1 | PORTION ID |
| 5 | LBA E | PBA ZZ | VERSION 1 | PORTION ID |
| : | : | : | : | : |
FIG. 5
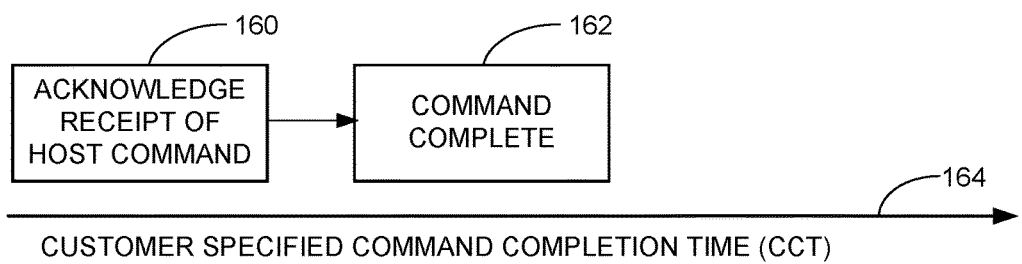
FIG. 6

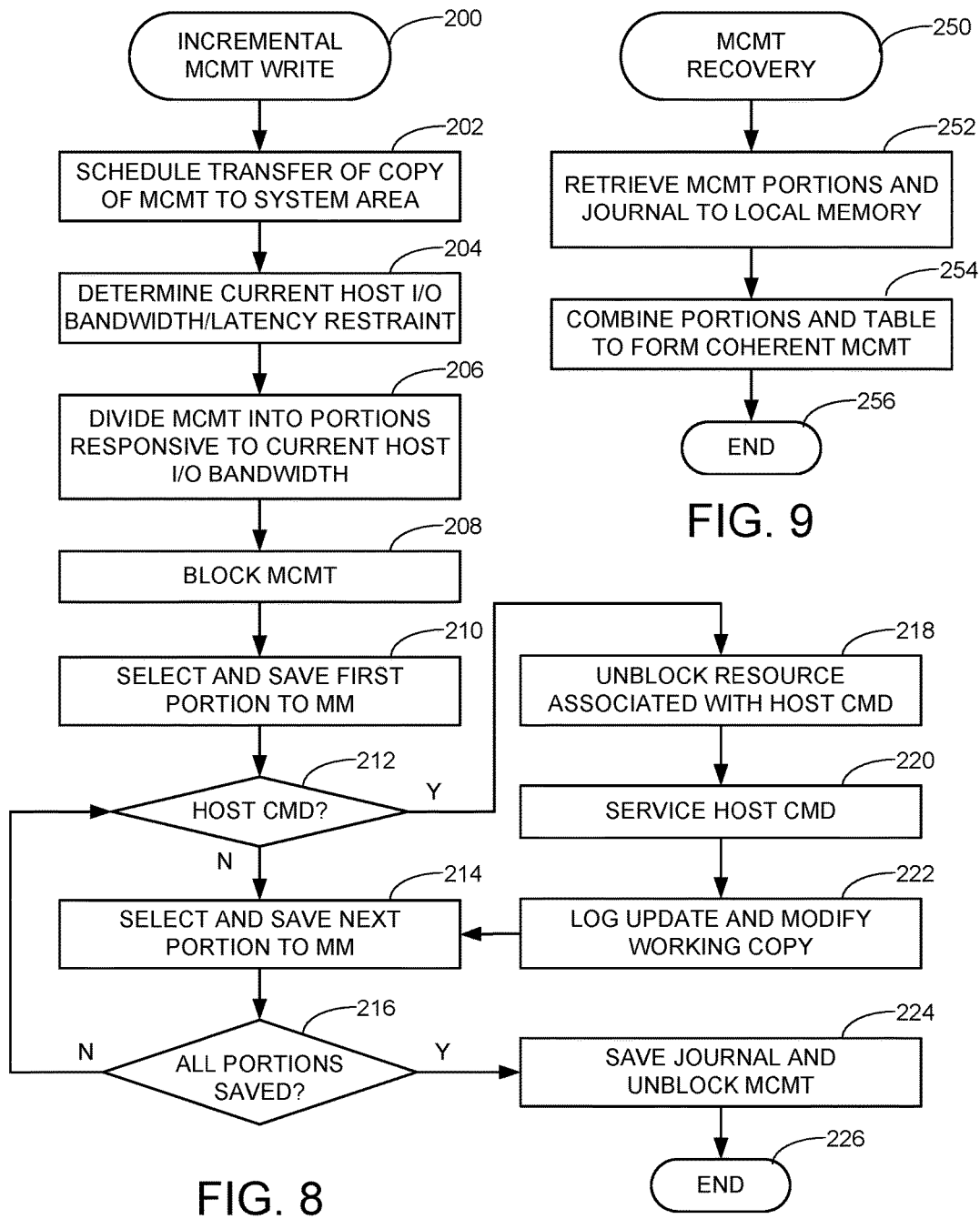

LATENCY SENSITIVE METADATA OBJECT PERSISTENCE OPERATION FOR STORAGE DEVICE

SUMMARY

Various embodiments of the present disclosure are generally directed to an apparatus and method for managing a metadata object in a data storage device.

In some embodiments, a metadata object has a plurality of entries that describe data sets stored in a non-volatile write cache. During an archival operation, the metadata object is divided into a plurality of successive portions each describing a different associated range of logical addresses. Each portion of the metadata object is copied in turn to a non-volatile memory to maintain a measured latency within a predetermined threshold. A journal data structure is generated to describe changes to the metadata object after the copying of the associated portions to the non-volatile memory. The journal is also stored to the non-volatile memory, and may be subsequently combined with the previously stored portions to recreate the metadata object in a local memory.

These and other features and advantages which may characterize various embodiments can be understood in view of the following detailed discussion and the accompanying drawings.

BRIEF DESCRIPTION OF THE DRAWINGS

FIG. 4 illustrates a media cache controller of the device in accordance with some embodiments.

FIG. 5 provides an exemplary format for a metadata object maintained by the media cache controller of FIG. 4.

FIG. 6 is a generalized timing block diagram illustrating the processing of a received host command within a command completion time (CCT).

FIG. 8 is a flow chart for an incremental MCMT write routine illustrative of steps carried out in accordance with some embodiments of the present disclosure.

FIG. 9 is a flow chart for an MCMT recovery routine illustrative of steps carried out in accordance with some embodiments of the present disclosure.

DETAILED DESCRIPTION

Figure 1:
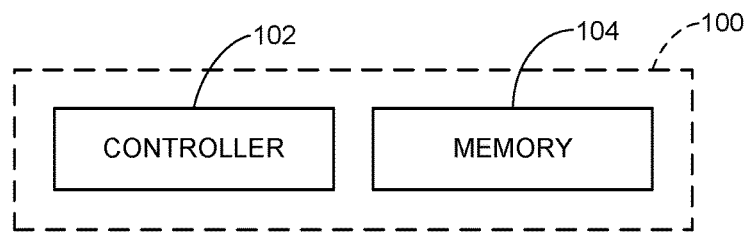
FIG. 1 provides a functional block representation of a data storage device in accordance with various embodiments of the present disclosure.

Various embodiments of the present disclosure are generally directed to the management of metadata in a data storage device.

Data storage devices are electronic-based user devices that include digital memory configured to store and retrieve data associated with a user. Storage devices can take a variety of forms, such as hard disc drives (HDDs), solid-state drives (SSDs), hybrid drives, thumb drives, multi-device arrays, etc. Such devices are often coupled to a host device to receive and store data for the host.

Some data storage devices are equipped with multiple non-volatile storage tiers. One or more tiers may be operated as a write cache to temporarily store write data received from a host until it can be subsequently transferred to another storage tier, such as a Main Store (MS), for longer term storage of the data. The various storage tiers may be physically realized in various memory devices and can take a variety of configurations including semiconductor memory (e.g., flash memory, powered DRAM, etc.), rotatable magnetic recording media, etc.

Storage devices that employ write cache tiers often implement a metadata management system that tracks the data written to the write cache, schedules the subsequent transfer of the data to the Main Store, and otherwise manages the write cache logical and physical cache resources. Such systems may generate and manage metadata objects to track the contents of the write cache. The metadata objects may take the form of data structures that are stored in a local memory, such as a master table that links logical addresses of the data to physical addresses within the write cache, a journal which is used to track updates to a given master table, etc.

Because of the critical nature of such metadata objects, some data storage devices employ mechanisms to ensure the data reliability of the metadata objects at all times. One such mechanism involves the generation and maintenance, in real time or near real time, of multiple redundant copies of the metadata objects in different locations in different memories within the device. In this way, should a data corruption event such as an unsafe power down operation occur, the system can at least theoretically recover the true state of the system during a subsequent system reinitialization with minimal loss of user data.

One problem associated with these and other mechanisms is the transfer time required to store backup copies of a metadata object to the various non-volatile tiers inside the device. For example, the overall size of a single copy of a master table can be significant, such as on the order of several tens or hundreds of megabytes, MB ($10^6$ bytes) or more. Depending on the properties of the destination media and the current host workload, transferring one or more copies of the master table to a non-volatile tier can have a significant impact on observed host I/O data transfer rates.

This problem is exasperated in some high performance data storage environments which include a strict customer command completion time (CCT) specification. A CCT specification requires the data storage device to complete a population of commands within a specified CCT interval. The specification may be expressed in terms of a latency distribution, such as only 1 out of X commands (such as 1/100,000 commands) can exceed the CCT interval. The CCT specification will be based on a number of factors, including the physical type of memory used to provide long term storage of the data. For example, data storage devices that employ rotatable magnetic recording media may have a specified CCT on the order of about 100 milliseconds, ms ($10^{-3}$ sec). Other data storage devices that employ semiconductor memory, such as SSDs, may have a shorter specified CCT such as on the order of about 1-10 ms. Other ranges may apply and will depend on the customer requirements for a given application so these ranges are merely exemplary and are not limiting.

The use of a write cache tier can enhance conformance of a data storage device to a given command latency distribution specification, since received input data can be quickly written to the media cache and a command completion confirmation message passed back to the host device well within the specified tolerances. Further conformance to the specification can be achieved using writeback caching techniques, where the device immediately informs the host that a given write request has been satisfied even if the data have not yet been stored to the media cache (or final main memory destination). Read commands, of course, cannot be declared to be completed unless the data storage device actually presents the requested data in a recovered state to the host device. Read commands are the principal challenge for storage devices using write back caching which must meet a prescribed latency tolerance.

It follows that a given data storage device with a CCT specification should be configured to handle a maximum amount of host activity (e.g., a maximum specified rate of host access commands, whether read commands or write commands), and ensure that the host device receives a command complete status for each command that is within the specified time frame. The overhead processing required to move data within the data storage device, such as from the media cache to main memory, will detract from the ability of the data storage device in satisfying newly received commands, and therefore should be handled in such a way that each received host command is still satisfied within the required interval.

A more significant issue, however, relates to persisting a master table (or other metadata object) to ensure the device reliably maintains an accurate map of the contents of the write cache throughout all power and environmental conditions (e.g., uncontrolled power loss, vibration environments, thermal environments, etc.). In some cases, it may not be possible to transfer a large metadata object to the destination non-volatile memory tier and still maintain compliance with the CCT specification. Scheduling the persistence operations of the metadata object to periods of lower host activity, when the CCT could be met, increases the risk that the metadata object contents will be corrupted or lost. And, in such a case, a read command during previously idle time would collide with and compete/contend with a metadata object persistence operation. Even in cases where the device is not subject to a CCT specification, large scale internal transfers of archived metadata object data sets can adversely impact the observed host data I/O data transfer rate, and therefore should be mitigated.

Various embodiments of the present disclosure address these and other issues by providing a method and apparatus for managing metadata associated with a write cache tier of a data storage device. As explained below, some embodiments maintain a metadata object, sometimes referred to as a master table or a media cache master table (MCMT), as a data structure in a local memory. The metadata object has a plurality of entries that describe data sets stored in the non-volatile write cache in various storage tiers of the data storage device. A persistence operation is carried out to transfer a copy or copies of the metadata object to another non-volatile storage tier in the system, such as a Main Store (MS) or other longer term storage location.

The metadata object is divided into a plurality of successive portions, with each portion describing an associated range of logical addresses. The logical addresses are host level addressing values used to identify individual user data blocks or ranges of user data blocks, and may take a variety of forms such as logical block addresses (LBAs), key block addresses, etc.

The various portions, or segments, of the metadata object may be nominally the same size, or may have different sizes. While not necessarily required, in some cases the portions may be sized responsive to a measured latency associated with communications between the write cache and the host device, such as but not limited to an observed host data transfer (I/O) rate so that the individual portions can be transferred while maintaining conformance to a specified customer command completion time (CCT).

Once segmented into portions, the metadata object may be temporarily blocked to prevent updates to the metadata object during the transfer process. Each of the portions is transferred in turn to a non-volatile memory (e.g., the MS or other tier) of the data storage device. The transfers may be in response to an absence of a pending host access command for the associated range of logical addresses described by that portion. If a host command is pending, that portion is unblocked, the command is serviced and the portion updated before being transferred, unless the transfer is already in progress. Another available portion may be saved to the main memory instead, so the portions need not necessarily be saved in order.

If during the transfer process a host command is received for a particular portion that has already been stored in the non-volatile memory (or is in process of being transferred), an entry is added to a journal. The journal, also sometimes referred to as an update table, is maintained as a time ordered data structure in the local memory and tracks changes to the metadata object during the transfer. In this way, once all of the portions have been written to the non-volatile memory, the journal can also be written to the non-volatile memory to journal the updates. As host commands are blocked, this would potentially cause additional journal entries during this transfer time. The metadata object copy stored in the non-volatile memory will be incoherent, but can be made coherent (up to date) by the merging of the updates from the journal.

Datecode and other control information (which may be considered meta-metadata) may be added to the journal to track the progress of the respective portions and ensure the archived metadata object copy provides an accurate reflection of the system state. By using this approach, multiple copies of the large metadata object may be serially or concurrently stored as required while maintaining acceptable levels of host I/O data transfer rates, including conformance to any applicable CCT specifications. As desired, multiple sets of update tables can be appended to and stored with a given archived metadata object to reflect the last known current state. In this way, various embodiments may be used to promote improved latency tail performance for CCT specified environments, while meeting requirements for data reliability, thereby enhancing quality of service (QOS) performance by the device.

These and other features and advantages of various embodiments can be understood beginning with a review of FIG. 1 which shows a simplified functional block representation of a data storage device 100. The data storage device 100 includes a controller 102 and a memory module 104.

The controller 102 is a hardware or processor based circuit that provides top-level control of the device 100. In some embodiments, the controller 102 may be one or more programmable processors that utilize programming instructions stored in a local memory which are executed by the processor as required.

The memory module 104 can take a variety of forms, and includes one or more forms of non-volatile data storage memory to store user data supplied by the host device. The non-volatile data storage memory can take a variety of forms including but not limited to rotatable magnetic recording media (discs), solid state semiconductor memory (e.g., flash memory cells, STRAM, RRAM, etc.), etc. The memory module 104 can include additional elements including read/write/erase control circuitry, data buffers, memory controller circuitry, etc. configured to manage the writing and subsequent reading of data to and from the non-volatile memory. In some cases, the controller functionality can be incorporated directly into the memory module.

Figure 2:
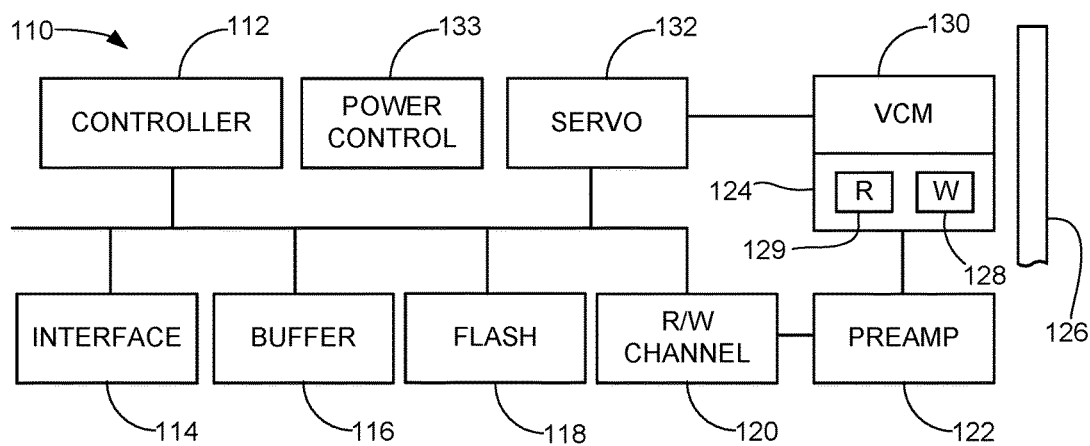
FIG. 2 is a functional block representation of the data storage device of FIG. 1 in accordance with some embodiments.

FIG. 2 shows a functional block representation of a data storage device 110 corresponding to the device 100 of FIG. 1. The data storage device 110 is characterized as a hard disc drive (HDD) in accordance with some embodiments. The various embodiments presented herein may be readily adapted for use with other forms of storage devices, such as but not limited to solid state drives (SSDs), hybrid storage devices (hybrid solid state drives, or HSSDs), etc.

A top level controller 112 similar to the controller 102 in FIG. 1 provides communication and control functions. An interface circuit 114 interfaces with the host device via a selected interface protocol (e.g., SATA, SAS, Fibre Channel, Ethernet, USB, etc.). A local data buffer 116 provides temporary storage of user data being transferred to and from the host. The buffer 116 may be a local memory, such as a DRAM, and may store control data and programming used by the controller 112 as well. A local non-volatile memory (flash) 118 can also provide local storage of data as required. The flash memory 118 may take a NAND and/or a NOR configuration.

A read/write (R/W) channel circuit 120 conditions data during write and read operations using a preamplifier/driver (preamp) circuit 122 and a data transducer 124. The transducer 124 is supported adjacent a rotatable magnetic recording medium (disc) 126 and includes a write (W) element 128, such as a perpendicular magnetic write coil, and a read (R) sensor 129, such as a magneto-resistive (MR) responsive element.

The respective elements 128, 129 are positioned adjacent concentric tracks defined on the data recording surface of medium 126 using a voice coil motor (VCM) 130 and a closed loop servo control circuit 132. Two or more servo loops may be used for multi-stage actuators (e.g., microactuators). While not shown in FIG. 2, the servo control circuit 132 also operates a spindle motor used to rotate the stack of magnetic media discs 126.

A power control circuit 133 receives and conditions power values, such as supply voltage and/or current, for use by the various active elements of the storage device 110. The power may be supplied by a local device such as a battery or externally from the host or another power source.

Figure 3:
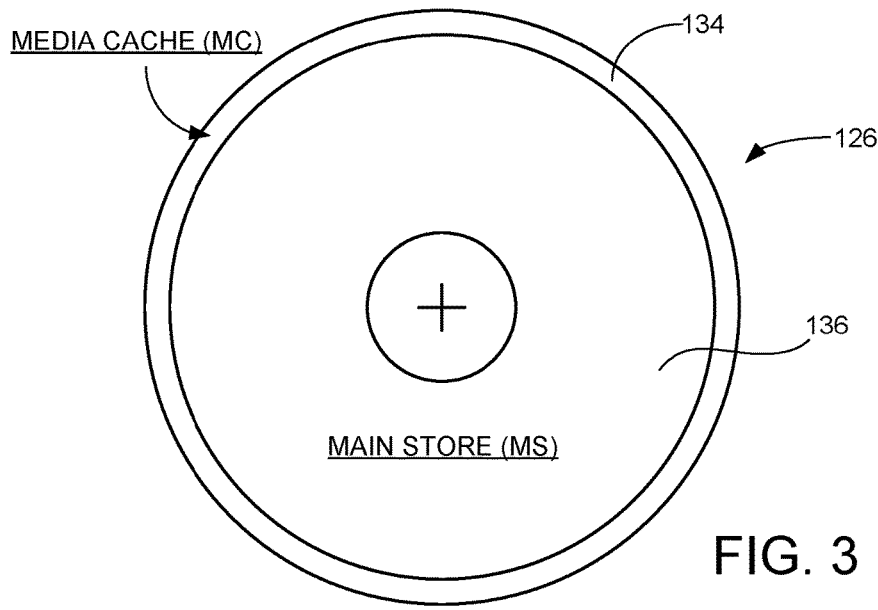
FIG. 3 shows a media cache and main store of a rotatable data recording surface of the device of FIG. 2 in accordance with some embodiments.

FIG. 3 shows a data recording surface of the medium 126 in accordance with some embodiments. The surface is arranged into two main zones: a media cache (MC) 134 and a main store (MS) 136. Each of these respective zones 134, 136 comprise a number of adjacent concentric data tracks configured to store user data supplied by the host device.

The media cache 134 may be arranged adjacent the outermost diameter of the recording surface as depicted in FIG. 3, or may be located elsewhere on the disc surface. In alternative embodiments, the media cache (or portions thereof) may be provisioned elsewhere within the storage device, including in the flash memory 118 (FIG. 2). The tracks can take any number of suitable forms, including perpendicular magnetic recording (PMR) tracks, shingled magnetic recording (SMR) tracks, two dimensional magnetic recording (TDMR) tracks, bit patterned media tracks, three dimensional magnetic recording (3DMR) tracks, etc.

As will be recognized, the media cache 134 operates as a non-volatile write back cache and temporary storage location for input write data. During a write operation, input data are received and temporarily stored in the buffer memory 116 (see FIG. 2). A write channel portion of the channel circuit 120 conditions the data by applying various encoding operations such as run length limited (RLL) encoding, encryption, data compression, error correction encoding (ECC), etc., and directions the writing of the encoded input data to the media cache 134. A write complete status may be returned to the host device prior to or after the writing of the data to the MC 134.

Thereafter, at an appropriate time a background data transfer operation may be scheduled and performed to subsequently transfer the data from the media cache 134 to the main memory 136. A copy of the data may be retained within the media cache 134 for a time, for example, to facilitate the possibility of cache hits upon the data. Cache management schemes, such as least recently used (LRU) eviction methods, can be used to maintain the data levels within the media cache 134 at appropriate levels.

At this point it will be noted that the example storage device (HDD) 110 utilizes a portion of the rotatable media 126 to form the write cache; hence the term, media cache. However, the following discussion can be readily adapted to use other aspects of the HDD, such as portions of the non-volatile flash 118 as the write cache. Similarly, the following discussion can be adapted for use in an SSD that does not include rotatable media so that the various tiers (e.g., write cache, main store, etc.) can be respectively realized using non-volatile flash or other semiconductor memory.

For the HDD 110, the size of the media cache 134 relative to the overall data storage capabilities of the main store 136 can vary depending on the requirements of a given application. In some cases, each of the data recording surfaces has its own portion of the media cache 134 arranged adjacent the OD of the associated surface as shown in FIG. 3, so that all of the portions comprise the overall available media cache. As noted above, other locations can additionally and/or alternatively used as the media cache as well, including at least a portion of the flash memory 118 in FIG. 2.

FIG. 4 shows a media cache controller circuit 140 constructed and operated in accordance with some embodiments. The MC controller 140 may form a portion of the top level controller functionality, or may be realized as a separate hardware or programmable processor of the storage device 110. For example, if a programmable servo processor is used as part of the servo control circuit 132, the MC controller 140 may be realized as the programmable servo processor and the associated portion of the programming of the processor. The MC controller 140 generally operates to manage data transfers into and out of the MC 134.

To this end, the MC controller 140 processes input host access commands, such as data read and write commands received from the host device, and outputs corresponding data transfer commands, such as commands to write data to the media cache 134, transfer data from the media cache 134 to the main memory 136, and so on. The MC controller 140 utilizes a number of inputs to perform these operations, including visibility to the host access commands that have been received by the data storage device, as well as certain host I/O data transfer rate statistics that indicate the current workload (e.g., available bandwidth) of the data storage device.

Because the MC controller 140 is required to maintain an up-to-date and accurate status of the data stored in the media cache 134, the MC controller maintains a number of metadata objects in various memory locations. The metadata objects are variously referred to herein as media cache master tables (MCMTs), master tables, or simply tables. These generally represent an overall map of the status of the media cache. Other metadata objects are sometimes referred to as journals or update tables, which represent partial updates to the master tables (MCMTs).

A first or primary table 142 is denoted as a current MCMT, and a secondary table 144 is denoted as an archive copy of the MCMT. The primary table 142 is stored in a local memory 146, such as DRAM. The secondary table 144 is stored in non-volatile memory (NVM) 148, such as the main store (MS) portion of the disc 136 in FIG. 3. As noted above, other suitable locations for the archive copy may include the flash memory 118 (FIG. 2), a portion of the media cache 134 (FIG. 3), etc.

A journal 150 is an additional structure that is also shown to be stored in the NVM 148. As explained below, the journal may take the form of an update table that includes a number of journal updates that, when integrated into the archive copy of the MCMT (secondary table 144), conforms the resulting combined structure to the current copy of the MCMT (primary table 142).

While only a single archived copy of the MCMT is shown in FIG. 4, multiple such copies may be maintained as required, including in different forms of NVM memory and/or different locations therein. The use of different non-volatile memory locations for the respective copies of the tables enhances data reliability through replication since at least one copy will presumably be recoverable even if an error condition arises associated with one of the memory locations. Similarly, while only a single update table is shown to be stored in the NVM 148, multiple such tables can be appended as required to journal further updates and maintain the archived MCMT copy in a condition to be placed in a current condition.

The archived copy/copies of the MCMT will be generated on a periodic basis at suitable times, including but not limited to a period of time just before deactivation of the data storage device 110. The frequency at which the archived copies are stored will vary depending on the requirements of a given application. During a subsequent re-initialization of the device, a copy of one (or more) of the tables will be reassembled in the DRAM 148 or other suitable local memory for ready access by the MC controller 140.

FIG. 5 illustrates an exemplary metadata object format. This format may correspond to the MCMTs and/or journal data structures from FIG. 4. Other formats may be used so that FIG. 5 is merely for illustration and is not limiting. The format includes a number of entries (rows) 152, with each entry associated with a block or set of data that has been placed in the media cache 134. In other embodiments each entry 152 may store one or more status values indicating whether a copy of the data has been transferred to the main memory 136, whether the data are current or stale, etc.

The first entry shows a particular data block identified as LBA A (logical block address A) is stored at a given PBA W (physical block address) and is currently identified as a first version (Version 1). The LBA value is one form of a logical address used at the host level to identify the block. A range of LBA values can be used in the table as desired to denote a range of LBAs. Each LBA may correspond to a fixed amount of user data, such as a sector of data of 512 bytes or some other amount. Other forms of host level logical addressing may be used including virtual block addresses (VBAs), key-block data values, etc.

The PBA value may identify a particular physical data sector within the MC 134, such as by track, offset from a once around index point, etc. If solid state semiconductor data are used as the MC, the PBA may instead identify a particular garbage collection unit (GCU), erasure block, page, bit offset, etc. Such addressing is well known in the art and can be utilized as required to fit the requirements of a given application.

Each entry 152 further shows a version number field and a portion ID field. The version number field specifies a particular version of the data; for example, the second entry shows LBA B stored at PBA X to be a third version ("version 3") for this data block Two previous writes of LBA B have been supplied (e.g., versions 1 and 2) and are stored elsewhere. Separate status data can be used to determine if the version 3 data are the most current version. The portion ID field can be used to indicate to which portion the associated entry belongs once the MCMT has been segmented into portions for piece-meal writing of the archived copy of the table to the NVM 148. The portion ID field can take a number of formats including time/datestamp data, portion ID values, transfer complete flags, update flags, etc.

FIG. 6 is a timeline diagram showing rudimentary servicing of a given host command. It is contemplated that such commands are issued by the host device and supplied to the data storage device 110. Without limitation, exemplary commands may include write commands to write data, read commands to retrieve previously stored data, status commands, scrub (e.g., secure erasure) commands, etc.

At a basic level, the processing of any given host command will include at least two main steps; acknowledged receipt of the command, as indicated by block 160, and the issuance of a command complete status for the command, as indicated by block 162. Receipt by the host of the command complete status will enable certain control releases to occur at the host level and issuance of new commands. Depending upon the interface between the host and the storage device, multiple queued commands, such as up to N pending commands, may be concurrently issued and pending, where N is some plural value (such as N=32, etc.).

It will be recalled that the issuance of the command complete status as indicated by block 162 may or may not correspond to actual completion of the command, at least with regard to write commands. For example, if writeback caching is employed, the storage device may issue write complete status indications to the host even if the data are still pending in a local volatile buffer, allowing the data storage device to subsequently transfer the data to non-volatile memory (e.g., the media cache or main memory) within a relatively short subsequent window. Read commands require actual recovery of the requested data in a form available to the host in order to be able to successfully report a command complete status.

FIG. 6 further shows an arrow 164 indicative of a customer specified command completion time (CCT). Not all embodiments of the present disclosure employ such a constraint, but it is contemplated that some will. As noted above, conformance to the CCT specification requires the issuance of the command complete status of block 162 before the expiration of the CCT interval, which commences with receipt of the command (block 160). Without limitation, exemplary CCT specifications for certain types of enterprise class storage devices may range from a few milliseconds, ms for solid-state based semiconductor memory to several tens or hundreds of ms for rotatable data recording media. Generally, the CCT specification may be expressed in terms of a latency distribution, such that less than 1 out of X commands (such as 1/100,000 commands) will exceed the specified latency tolerance.

Figure 7:
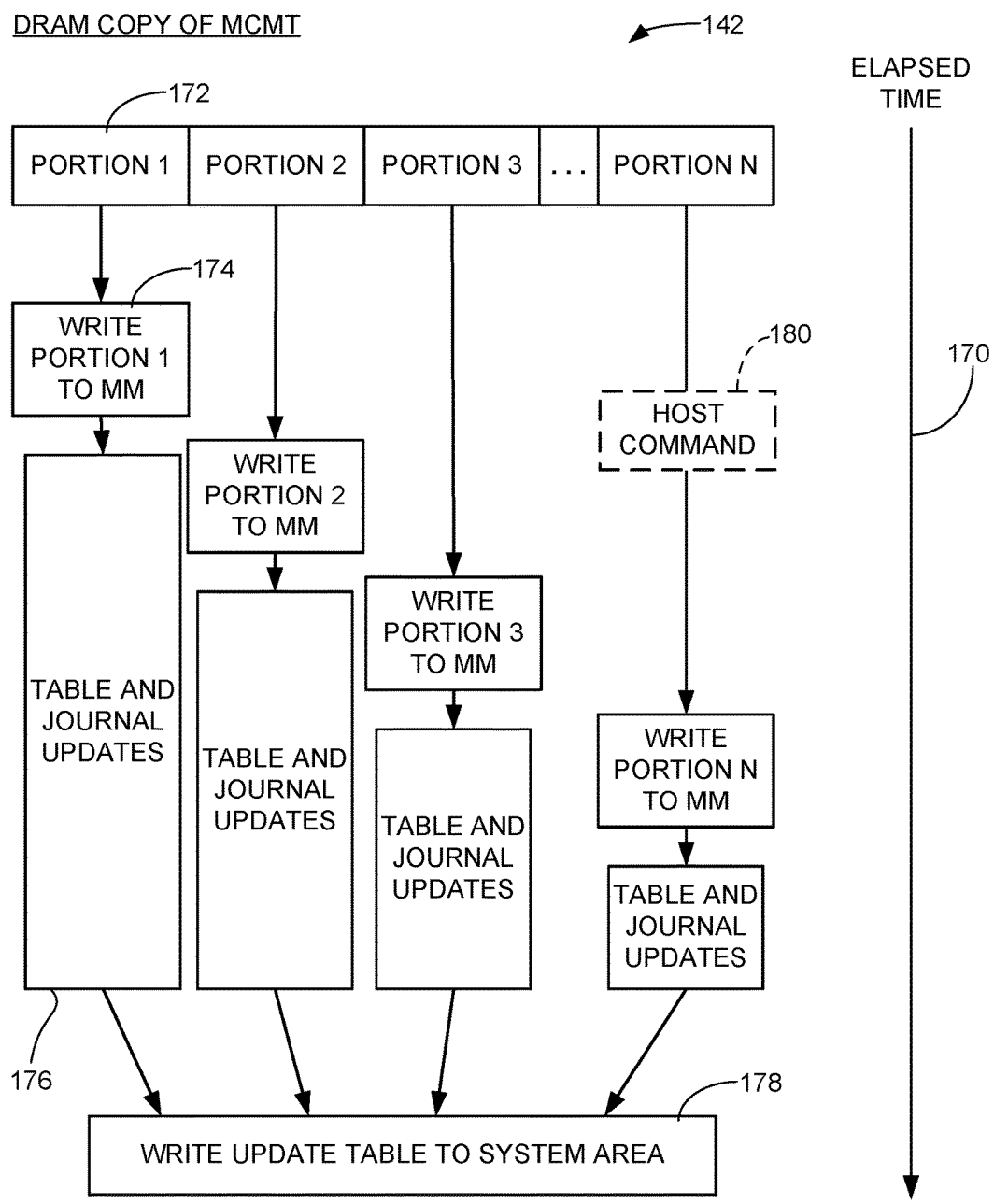
FIG. 7 illustrates a process flow in which a copy of the MCMT is archived to non-volatile memory in accordance with some embodiments.

FIG. 7 provides another timing diagram to illustrate the writing of the MCMT to non-volatile memory, such as the persistent MCMT table copy 144 in FIG. 4, during a persistence operation. It is contemplated the copying process takes place over an extended period of time, as generally represented by elapsed time vector 170. The actual amount of time to complete the process will depend on a number of factors including the current workload of the data storage device, the size of the MCMT 142, etc.

Initially, the current version of the MCMT 142 resident in the local memory (DRAM) 146 (see FIG. 4) is segmented or divided into a number of successive portions 172. A total number of N portions is represented in FIG. 7. Any number of portions can be used. Each portion constitutes a corresponding number of entries 152 (FIG. 5) of the MCMT 142 for a different range of logical addresses. Each portion may be the same size, or may be a different size than other portions. Generally, the size(s) will be proportional to the CCT requirements.

During the course of the archiving process, each portion is saved to the NVM 148 at a different time, as indicated by write blocks 174. The portion may be written by generating an internal write command, assembling the data corresponding to the associated portion of the MCMT, scheduling the writing operation and then writing the portion to the NVM. Various encoding steps may be applied including encryption, data compression, error correction code (ECC) encoding, etc. Depending on the size of the MCMT and the number of portions, each portion will be sized to correspond to a manageable block of memory that can be written to the NVM while ensuring that any applicable CCT specifications (e.g., FIG. 6) are still met for pending host commands. The portions from 1 to N are shown to be written in order, but this is merely illustrative and is not limiting; the portions may be written in a different order, as explained more fully below.

A number of update window blocks 176 are shown to follow the writing of each of the portions in blocks 174. These windows represent a respective time period in which one or more updates may arise as a result of the receipt and processing of one or more host commands for the associated portion. It is possible that no such updates will actually be received for a given portion that has been stored to the NVM, but to the extent that such updates occur, the updates are accumulated in local memory to form the update table. Once all of the portions have been written to the NVM, block 178 shows the writing of the update table to a system area, which is a NVM location such as the MS. At this point, the archiving (persistence) operation is completed.

It is contemplated that updates to the MCMT may arise prior to the writing of a particular portion; for example, an update (pending host command) may be received prior to the writing of portion N, such as indicated by dotted box 180 in FIG. 7. In this case, in at least some embodiments the host command (box 180) is serviced and the portion N of the MCMT 142 is updated to reflect the new information prior to the writing of the portion N. it will be noted that only host commands that enact a change in the state of the MCMT are under consideration; host commands that do not change the MCMT, such as for example a read command, will be serviced normally without impacting the flow of FIG. 7.

If there are portions 172 with pending host commands (such as at 180) and there are other portions without pending host commands, the controller 140 may elect to proceed with the writing of the portions 172 without the pending host commands, so that the various portions may be written out of sequence to the NVM.

FIG. 8 shows an incremental MCMT write routine 200 illustrative of exemplary steps that may be taken in accordance with the foregoing discussion. The various steps may represent programming stored in a local memory and executed by the controller 140 of FIG. 4 during an archiving operation for the MCMT 142. Other processing can be used so that the various steps can be modified, appended, omitted, performed in a different order, etc.

At step 202, the process commences with the scheduling of a copy of the then-current MCMT to non-volatile memory to provide an archived data set such as discussed above in FIG. 4. This can be scheduled in a variety of ways and based on a number of factors. In some cases, a backup policy may be enacted so that at least one archived copy of the MCMT is generated after a certain elapsed period of time during continued operation. In other cases, an archived MCMT may be enacted responsive to a scheduled or unscheduled power down event for the data storage device. In the latter case, the routine 200 may form a portion of a more general shutdown routine enacted by the device that is carried out using available shutdown power generated onboard by the device (e.g., back emf from the still rotating magnetic recording discs, backup power stored in standby capacitors supplied for that purpose, etc.).

Step 204 shows a determination of an existing current host I/O data transfer rate bandwidth. While this step is optional, in some cases this information can be useful as part of the partitioning process of step 206 in which the current version MCMT is segmented into a plurality of successive portions. A higher existing workload for the storage device may result in the selection of smaller sized portions, and vice versa. Selection may be scaled to ensure continued conformance to CCT specifications.

Once the MCMT has been divided into portions, step 208 proceeds to temporarily block the MCMT from further updates. This freezes the MCMT in place so that, nominally, the archived MCMT copy will match the MCMT at this point. Updates can be handled as discussed above. Time/date stamp and other control values can be used to track this process.

A first portion of the MCMT is thereafter selected and saved to the NVM (e.g., main memory 136) at step 210. Decision step 212 determines whether a pending host command is pending that would result in an update to the blocked MCMT. If not, the process flows to step 214 where a next portion of the MCMT is selected and saved to the NVM. Decision step 216 determines whether all portions have been saved; if not, the process returns back to 212.

In this way, if no pending host commands are present, the respective portions are saved in the piece-meal fashion depicted in FIG. 7. It will be noted that even if no pending host write commands are present, the device may be operating in a read-intensive environment, so that the breaking up of the MCMT still enables the device to satisfy the CCT specification or otherwise carry out the archiving process in such a way as to not adversely affect overall host I/O data transfer rates. The rate at which the respective portions are saved may be adjusted to maintain the measured host I/O data transfer rate within a selected threshold; for example, the copying of a particular portion may be delayed responsive to receipt of a large number of pending commands, etc. to maintain a selected I/O data transfer rate.

Returning to decision step 212, at such time that a pending host command is detected that would result in a change to the MCMT (e.g., a write command, etc.), the process flow passes to step 218 where the associated resource in the current version MCMT in the local memory (e.g., DRAM 146) is unblocked to enable processing of the host command, as indicated at step 220. The update is logged at step 222 and the routine passes back to step 214 to save and store the next portion.

It will be noted that if the host command is executed prior to the archiving of the associated portion, the updated portion is stored and the update is not included in the update table. Contrawise, if the host command is executed after the archiving of the associated portion, the update is added to the update table at step 222.

Once all portions of the MCMT 142 have been archived, the flow passes from decision step 216 to step 224 where the update table is also stored to the NVM, after which the process ends at step 226. As noted above, the routine 200 of FIG. 8 may be carried out multiple successive times as required to provide continually generated updates of the MCMT.

FIG. 9 provides a flow chart for an MCMT recovery routine 250 used to subsequently load an archived copy of the MCMT. The routine is carried out at appropriate times, such as during a re-initialization operation of the device. As before, the routine is exemplary and other steps can be carried out as desired.

The routine is relatively straightforward. The MCMT portions and update table previously generated and stored during the routine of FIG. 8 are retrieved from the NVM to local memory at step 252, and the respective portions and update table are combined to provide a current (coherent) version of the MCMT at step 254 for subsequent use by the controller 140. The recovery routine is shown to end at step 256. The routine 200 of FIG. 8 is thereafter utilized as required during this next storage device operational session. It will be appreciated that additional steps may be included in FIG. 9, such as an integrity check on the assembled table, a failure mechanism to enable a detected failure to be addressed, etc.

Figure 10:
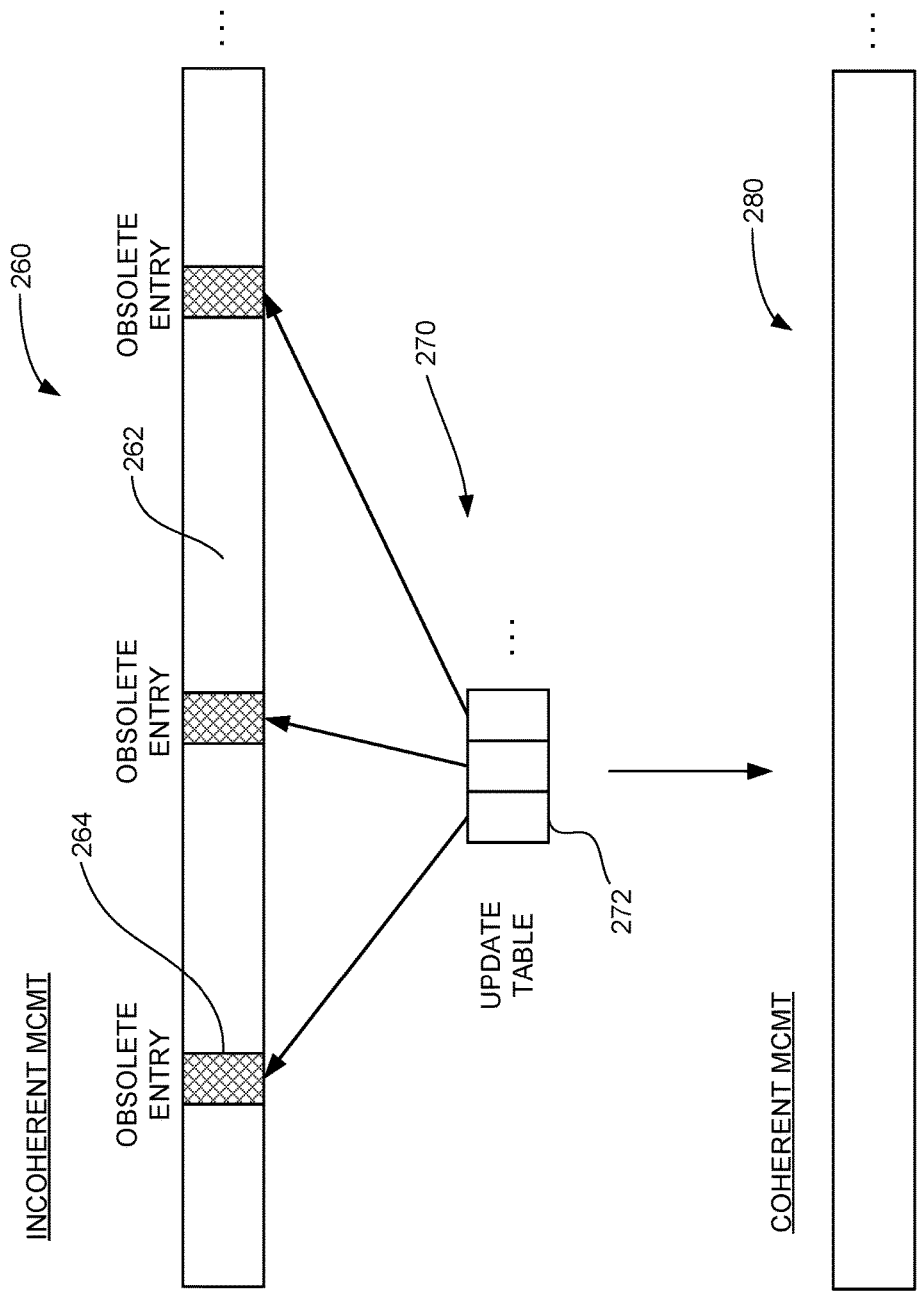
FIG. 10 is a block diagram illustrating operations carried out by the respective routines of FIGS. 8-9.

FIG. 10 is a diagram to illustrate the flow of FIG. 9. An incoherent copy of the MCMT is generally represented at 260, and represents the portions of the MCMT that were archived to the NVM. The entries include up-to-date (current) sections denoted generally at 262, and various obsolete entries at 264. The current version entries for the obsolete entries are stored in the corresponding update table (journal) 270. Up-to-date entries 272 in the update table 270 are used to replace the obsolete entries 264 to provide a coherent (current) MCMT 280.

It will be understood that the various embodiments presented herein can provide a number of benefits. The archiving of MCMT copies helps facilitate reliable tracking of the contents of a media cache. The partitioned and selective blocking of the MCMT during the archiving process helps to ensure that overall host I/O data transfer rates are not adversely impacted, and that any applicable CCT specifications are maintained.

While various embodiments have been directed to a data storage device such as an HDD that uses rotatable magnetic recording media as the main memory store, this is merely exemplary and is not required as the various techniques disclosed herein can be readily adapted to any number of different forms of data storage devices.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. For example, the particular elements may vary depending on the particular application without departing from the spirit and scope of the present technology.

What is claimed is:

1. A method comprising:
maintaining a metadata object as a data structure in a local memory, the metadata object having a plurality of entries that describe data sets stored in a write cache comprising a non-volatile memory;
dividing the metadata object into a plurality of portions, each portion constituting a corresponding subset of the plurality of entries for a different range of logical addresses selected responsive to a latency associated with transfers between the write cache and a host device;
copying each portion in turn to a non-volatile memory to maintain the latency at a desired level with respect to a predetermined threshold;
generating a journal as a data structure in the local memory having a plurality of time-ordered entries that describe changes to the metadata object during and after the copying of the associated portions to the non-volatile memory; and
storing the journal to the non-volatile memory after all of the portions of the metadata object have been stored in the non-volatile memory.

2. The method of claim 1, further comprising subsequent steps of transferring the journal and the portions of the metadata object from the non-volatile memory to the local memory responsive to a re-initialization operation, merging the time-ordered entries of the journal with the portions of the metadata object to provide a current version metadata object, and updating the current version metadata object responsive to subsequent transfers of additional sets of user data into and out of the write cache.

3. The method of claim 1, wherein the metadata object is a master table comprising a plurality of table entries, each table entry associating a logical address of a user data block to a corresponding physical address of the user data block in the write cache.

4. The method of claim 3, wherein the master table comprises at least a selected one of a B+ tree, a linear tree or a two level tree.

5. The method of claim 1, wherein each of the portions of the metadata object has a same overall size.

6. The method of claim 1, wherein the write cache comprises a media cache, the media cache comprises a first portion of a rotatable data recording medium, and the non-volatile memory comprises a different, second portion of the rotatable data recording medium.

7. The method of claim 1, wherein the write cache comprises a semiconductor memory.

8. The method of claim 1, further comprising storing a first portion of the plurality of portions of the metadata object to the non-volatile memory, receiving a host command from the host device associated with a second portion of the metadata object prior to writing the second portion of the metadata object to the non-volatile memory, and servicing the received host command and updating the second portion prior to writing the second portion to the non-volatile memory.

9. The method of claim 1, wherein the latency comprises a data transfer rate associated with a transfer of data with the host device.

10. The method of claim 9, wherein the predetermined threshold is a threshold data transfer rate selected in relation to a specified command completion time comprising an elapsed time from receipt of a host command to completion of the host command.

11. The method of claim 10, further comprising receiving a host command for a selected portion not yet transferred to the non-volatile memory, temporarily unblocking the selected portion while maintaining the remaining portions of the media cache master table in a blocked condition to facilitate execution of the received host command and updating of the selected portion, reblocking the updated selected portion and writing the updated selected portion to the non-volatile memory.

12. The method of claim 1, further comprising temporarily applying a block to the metadata object in the local memory during the transfer of the respective portions thereof to the non-volatile memory so that no updates are applied to the metadata object during the application of said block.

13. The method of claim 1, wherein the portions stored in the non-volatile memory form an incoherent media cache master table, and the method further comprises replacing selected entries in the incoherent media cache master table with the entries in the update table to form a coherent media cache master table in the local memory.

14. The method of claim 1, wherein for each portion in turn, the method comprises copying the portion to the non-volatile main memory responsive to an absence of a pending host access command for the associated range of logical addresses and blocking execution of any subsequently received host access commands for the associated range of logical addresses during said copying, else delaying said copying and blocking steps for the portion responsive to a presence of a pending host access command for the associated range of logical addresses until completion of execution of said pending host access command.

15. A data storage device, comprising:
a non-volatile memory configured to store user data from a host device;
a write cache comprising a non-volatile cache memory configured to temporarily store user data prior to transfer to the non-volatile memory;
a local memory which stores a metadata object as a data structure having a plurality of entries that describe the user data stored in the write cache; and
a cache manager circuit configured to divide the metadata object into a plurality of portions each associated with a different range of logical addresses for the user data stored in the write cache, to copy each portion in turn to the non-volatile memory at a rate that is adjusted to maintain a measured latency associated with data transfers between the data storage device and the host device within a predetermined threshold, to generate a journal as a data structure in the local memory having a plurality of entries that describe changes to the metadata object after the copying of the associated portions to the non-volatile memory, and to store the journal to the non-volatile memory after all of the portions of the media cache memory table have been stored in the non-volatile memory.

16. The data storage device of claim 15, wherein the cache manager circuit is further configured to subsequently direct a loading of the journal and the portions of the metadata object to the local memory responsive to a re-initialization sequence for the data storage device, to merge the entries in the journal with the portions of the metadata object to provide a current version metadata object, and to update the current version metadata object responsive to transfers of user data to and from the write cache.

17. The data storage device of claim 15, wherein the metadata object comprises a plurality of entries, each entry associating a logical address of a user data block to a corresponding physical address of the user data block in the write cache.

18. The data storage device of claim 15, wherein for each selected portion in turn, the cache manager circuit operates to copy the selected portion to the non-volatile memory responsive to an absence of a pending host access command for the associated range of logical addresses and block execution of any subsequently received host access commands for the associated range of logical addresses during said copying, and wherein, responsive to a presence of a pending host access command for the associated range of logical addresses for the selected portion, delaying the copying of the selected portion until the pending host access command is executed.

19. The data storage device of claim 15, wherein the write cache is characterized as a media cache comprising a first portion of a rotatable data recording medium, and the non-volatile memory comprises a different, second portion of the rotatable data recording medium.

20. The data storage device of claim 15, wherein the metadata object is a master table comprising a plurality of table entries, each table entry associating a logical address of a user data block to a corresponding physical address of the user data block in the write cache.

* * * * *